(12) United States Patent
Fischer et al.

(10) Patent No.: US 11,161,613 B2
(45) Date of Patent: Nov. 2, 2021

(54) POWER LIMITATION FOR A GALLEY

(71) Applicant: DIEHL AEROSPACE GMBH, Ueberlingen (DE)

(72) Inventors: Erik Fischer, Meersburg (DE); Juergen Spaeh, Ueberlingen (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 0 days.

(21) Appl. No.: 16/743,491

(22) Filed: Jan. 15, 2020

(65) Prior Publication Data
US 2020/0239142 A1    Jul. 30, 2020

(30) Foreign Application Priority Data

Jan. 25, 2019   (DE) .................. 102019000536.8

(51) Int. Cl.
*H02J 7/00*     (2006.01)
*H02J 4/00*     (2006.01)
*B64D 11/04*    (2006.01)

(52) U.S. Cl.
CPC ........... *B64D 11/04* (2013.01); *H02J 4/00* (2013.01); *H02J 7/0068* (2013.01); *B64D 2221/00* (2013.01); *H02J 2310/44* (2020.01)

(58) Field of Classification Search
None
See application file for complete search history.

(56) References Cited

U.S. PATENT DOCUMENTS

| 5,914,542 | A | * | 6/1999 | Weimer | H02J 7/345 |
| | | | | | 307/125 |
| 5,936,318 | A | * | 8/1999 | Weiler | H02J 4/00 |
| | | | | | 307/66 |
| 8,209,101 | B2 | * | 6/2012 | Breit | H02J 3/14 |
| | | | | | 701/80 |
| 8,513,829 | B1 | * | 8/2013 | Wells | H02M 7/797 |
| | | | | | 307/9.1 |
| 10,630,082 | B1 | * | 4/2020 | Gu | B60L 53/60 |
| 2002/0175567 | A1 | * | 11/2002 | Marin-Martinod | |
| | | | | | B64D 11/00155 |
| | | | | | 307/29 |
| 2004/0057177 | A1 | * | 3/2004 | Glahn | H02J 3/14 |
| | | | | | 361/62 |

(Continued)

OTHER PUBLICATIONS

Wikipedia, "Galley", retrieved from the Internet at URL: https://de.wikipedia.org/wiki/Galley, downloaded on Nov. 22, 2018.

*Primary Examiner* — Rexford N Barnie
*Assistant Examiner* — Terrence R Willoughby
(74) *Attorney, Agent, or Firm* — Scully Scott Murphy and Presser

(57) ABSTRACT

A device module for a galley of a passenger aircraft contains electrical consumers with a maximum total electrical power, a power input for an on-board power supply system of the passenger aircraft to feed in electrical input power, an energy storage device for energy from the power input for the consumers, and a control unit to limit the input power to a maximum value less than the maximum power, and to feed a power surplus of the input power to the energy storage device in order to feed additional power for consumers from the energy storage device.

A galley contains the device module.

In a method for operating the device module, the input power is limited to the maximum value, a power surplus is fed to the energy storage device, and additional power is fed to the consumers from the energy storage device.

17 Claims, 2 Drawing Sheets

(56) References Cited

U.S. PATENT DOCUMENTS

| | | | |
|---|---|---|---|
| 2005/0266300 A1* | 12/2005 | Lamoreux | H01M 2/202 |
| | | | 429/50 |
| 2012/0223185 A1* | 9/2012 | Tran | B64D 11/04 |
| | | | 244/118.5 |
| 2015/0028670 A1* | 1/2015 | Boodaghians | B64D 11/04 |
| | | | 307/9.1 |
| 2016/0176526 A1* | 6/2016 | Becker | B64D 11/04 |
| | | | 307/9.1 |
| 2018/0138716 A1 | 5/2018 | Bailey et al. | |

* cited by examiner

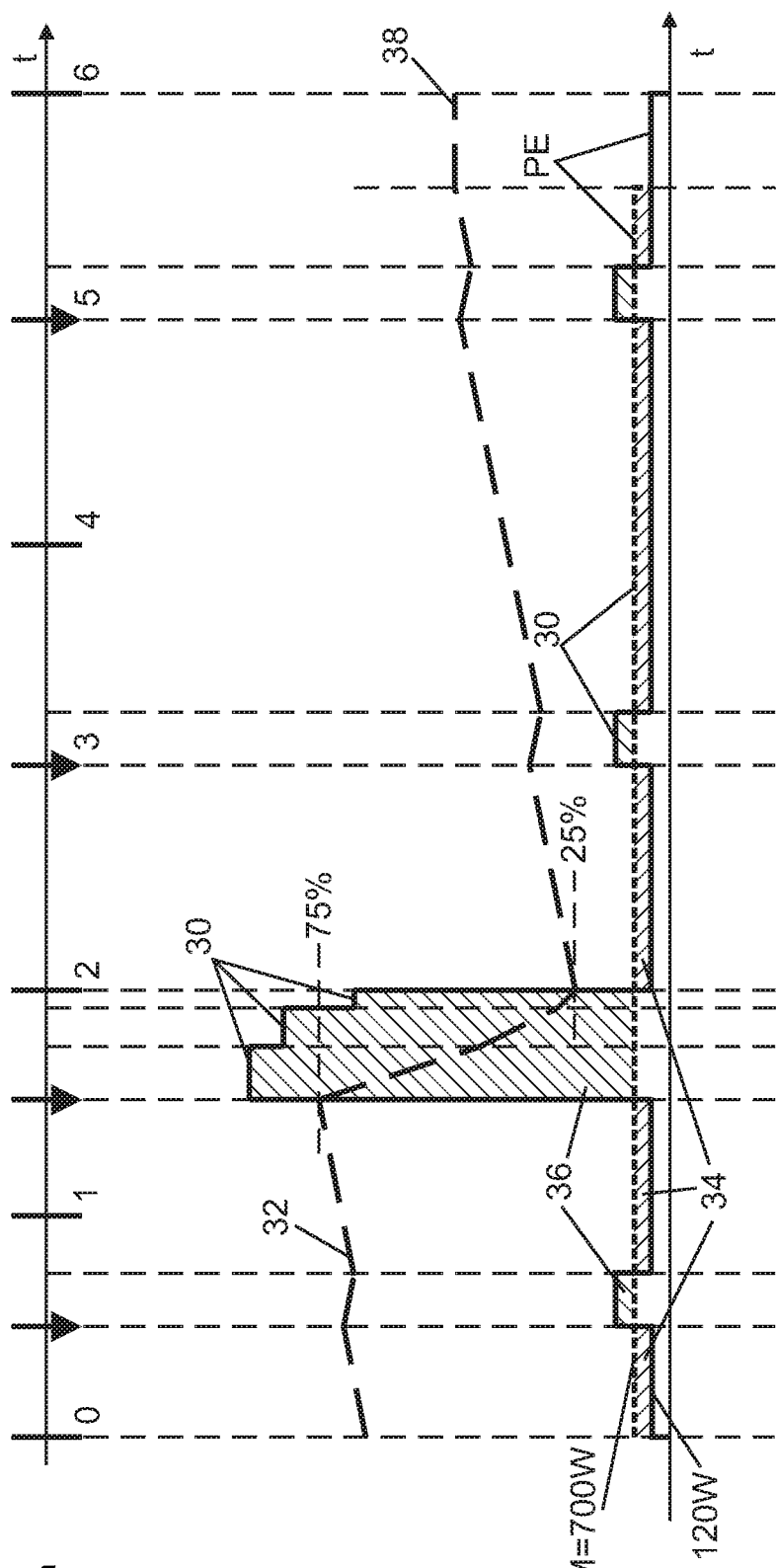

POWER LIMITATION FOR A GALLEY

BACKGROUND OF THE INVENTION

The invention relates to a galley of a passenger aircraft.

DISCUSSION OF THE PRIOR ART

Galleys of this type which are known from practice (see e.g. "Wikipedia, 'Galley', https://de.wikipedia.org/wiki/Galley, downloaded on 22.11.2018") normally contain a plurality of electrical devices. These normally have a substantial total connected load of e.g. 15 kW. The object of the invention is to improve the energy supply of a galley.

SUMMARY OF THE INVENTION

The present invention is directed to a device module for a galley of a passenger aircraft. The invention is also transferable to other consumer concentrations instead of the galley in other aircraft instead of the passenger aircraft. Such concentrations are relevant to the invention if their combined total power is comparatively high compared with their total energy consumption during a flight, i.e. if the total power is required for only a short time period compared with the flight duration. However, the invention is shown here by way of example with reference to the galley concerned, since the invention is particularly advantageously usable here.

The device module in accordance with the present invention contains at least one, in particular a plurality, in particular at least 2, 3, 4, 5, 8 or more electrical consumers. A consumer is, for example, a refrigerator or a lighting element, a beverage maker, an oven (convection oven, bread oven) a microwave, a coffee machine, a water boiler, etc.

The device module internally has a total maximum electrical power of all consumers. "Internally" means that this power consumption takes place within the device module. The maximum possible powers of all devices consumable by the respective devices at any time are added together. The maximum power thus corresponds to the total power of all devices if they were all working at the same time with their maximum power consumption. Here, the individual power of one device is therefore its peak power, although its rated power can also be used for a simplified determination of the maximum power. It is also possible to carry out an illustrative, type-related or individual power measurement.

Since the power consumption of the galley (with installed device module/in operation) corresponds to that of the device module, the term "galley" is used below as a synonym for the device module for illustrative purposes.

The device module has a power input or electrical input connection. This is used for the external supply of the device module from an on-board power supply system of the passenger aircraft or for the electrical connection to the on-board power supply system. The power input in each case has a prevailing electrical input power. This is the power which the device module, i.e., if applicable, the direct consumers (see below) and the energy storage device, actually draws at the present time as the total power. The device module is therefore fed at a specific time with the corresponding input power from the on-board power supply system. The power input is, in particular, a 28 VDC, 115 VAC, 230 VAC or 270 VDC input and/or is designed, in particular, as three-phase.

The device module contains an electrical energy storage device for the temporary storage of electrical energy from the power input and, internally, i.e. inside the device module, for the output of the temporarily stored energy to at least one of the consumers (or for feedback into the on-board power supply system, see below). The energy storage device of the device module is configured according to the number and duration of the peak power consumption of the connected consumers. The corresponding observations regarding the maximum power consumption above also apply accordingly to the design of the energy storage device. Here, for example, the rated power of all consumers can be multiplied by their operating time. Alternatively, however, consumption measurements can also be carried out, since e.g. in the case of an oven, the rated power is drawn only in pulses (in heating phases), so that the actually consumed energy quantities are less than the rated power multiplied by the operating time.

The device module further contains a control unit. The control unit is configured or designed, e.g. through wiring, programming, etc., to limit the input power constantly to a maximum value. The maximum value is less than the maximum power, and does not therefore correspond to the total value of the connected consumers. The control unit is further configured to feed input power (coming from "outside") which, if applicable, is not required at that time by the consumers as a power surplus ("internally") to the energy storage device and to feed ("internal") additional power which, if applicable, is required at that time for consumers and is not covered ("externally") from the power input to the consumers ("internally") from the energy storage device. The term "if applicable" is to be understood in each case to mean that this situation may or may not arise, depending on the operating state of the consumers.

The invention is based on the assumption that the device module is operating in a fault-free manner according to its intended use. The input power is therefore constantly limited in operation by the control unit to a value which corresponds at most to the maximum value. The input power can therefore be zero, can be less than the maximum value or can also correspond to the maximum value. In any event, the maximum value is never exceeded. The respectively residual present additional power required by the consumers, and, if applicable, the total consumer power also (with an input power of zero) is therefore drawn from the energy storage device.

Consumers whose power consumption is greater than the maximum value must therefore be supplied at least partially from the energy storage device, since such a high power cannot be fed in via the power input.

The "additional power" is therefore a required differential power which cannot be covered or is not presently covered from the power connection.

The present invention is based on the realization that a galley has a high energy requirement for the preparation of food, but only for a very short time period compared with the total flight duration of a mission (a flight). The on-board power supply system or its power connection for the galley (at the power input of said galley) is designed in current practice (continuously) for this power peak.

The invention is based on the fundamental idea of implementing a concept for reducing connected loads (e.g. in a galley) of a (passenger) aircraft.

According to the invention, an intelligent battery buffering (energy storage device) is therefore loaded, in particular continuously, with a constant small "external" energy quantity or power from the on-board power supply system. At the time of demand (operation of the consumers, e.g. boiling/cooking, baking, etc.), the device module or the control unit or the energy storage device then makes the sufficiently high energy requirement (power requirement) available "internally" to the galley for a relatively short time period. The on-board power supply system is protected, in particular, against sudden power changes.

According to the invention, the device module cannot therefore have the "internal" maximum power of all consumers "externally", i.e. at the power input, but only a fraction thereof (e.g. 10%) which is to be defined.

The present invention offers the advantage that the power generator of the passenger aircraft can be dimensioned e.g. up to 50% (or more or less) smaller. The feeder lines, including the fuse elements of the galley, can be dimensioned up to one tenth smaller and can therefore also become much lighter. Alternatively, if the power generator size remains the same, (a large quantity of) energy or power is available for other applications. The maximum connected load must no longer be offered continuously to the galley or to other consumers which require energy for only a short time period. The invention is therefore not restricted only to a device module for a galley, but can be used generally for any consumers which have a very high power requirement for only a short time period in relation to a flight duration.

According to the invention, an iLEG (innovative Low Energy Galley) is provided which requires only a comparatively low connected load (e.g. approximately 1.4 kW) from the aircraft on-board power supply system instead of the provision of a high-power (e.g. 15 kW) connection due to intelligent energy storage device (battery) buffering. The connected load can thus be reduced to a lower value, e.g., in particular, to less than 1/10 in comparison with the original conventional value.

An intelligent battery buffer with a high, short-time energy flow (power) or a galley with an energy buffer (in particular e.g. a battery/accumulator buffer) is provided according to the invention. The invention is suitable for use in a galley or in other applications with a short-time, high energy requirement (power requirement).

With a suitable dimensioning of an energy storage device, said energy storage device requires no service (if no faults occur) over a plurality of years (e.g. 3 or 5 years). In this time period, no service actions are furthermore required for the energy storage device, e.g. the batteries, except in the event of fault repairs.

The capacity value of today's energy storage devices in the form of batteries degrades by approximately 10% only after approximately 3000 total discharge cycles. Assuming that an aircraft flies three missions per day lasting 4-6 hours, this therefore means that the battery capacity will decrease to 90% only after approximately 3 years. A 1.8 kWh energy storage device, for example, would then still have a required capacity of 1.6 kWh.

The complete electrical system (including energy storage device, e.g. battery) of the device module can be integrated within the galley (on final completion of the galley in the passenger aircraft). The operator of the aircraft, e.g. an airline, requires no new processes or separate infrastructure in order to bring energy on board. The device module has no extremely high thermal dissipation which would require a dedicated disposal system. No special outlay is therefore required to dispose of the resulting dissipation (heat). The device module is a very simple, transparent system which requires no further interface to the aircraft.

The comparatively high connected load for the consumers is required only within the galley in the energy storage device—(if necessary) converter—consumer chain.

In one preferred embodiment, the maximum value of the input power is at most 70% of the maximum power of the consumers. In particular, the maximum value is 50%, 40%, 30% 25%, 20%, 15%, 10% or 5% of the maximum power. In terms of cost (in the form of an energy storage device, etc.) versus benefit, a particularly favourable reduction in the connected power for the galley, downsizing of the generator, reduction in the cable cross sections, etc., as explained above, can be undertaken in the passenger aircraft compared with a 100% connection (maximum value=maximum power).

In one preferred embodiment, the control unit is configured to maintain the input power constantly at the maximum value as long as the energy storage device has not yet attained a target state of charge, or to control said input power according to a configurable profile. According to the first variant, the input power is therefore maintained permanently at the maximum value and not at a lower value, regardless of whether a power surplus exists. The input power is zero only if e.g. the energy storage device is full and no consumer is drawing energy. Any surplus power in relation to the maximum value which is not presently required by the consumers is fed to the energy storage device and is stored there. In particular, the maximum value is maintained permanently or in flight phases with normal energy availability for the galley. The only exceptions are then specific particular situations, e.g. an emergency, landing, flight take-off, etc., in which, as in the case of conventional galleys also, their power supply is restricted or switched off. The target state of charge can be variable over time, e.g. it can differ before and after the scheduled preparation of a meal.

According to the second alternative, a respective presently desired power for the device module is drawn from the on-board power supply system in order e.g. to compensate for power fluctuations in the remaining on-board power supply system.

In one preferred embodiment, at least one of the consumers is a direct consumer which is supplied with energy directly from the power input, bypassing the energy storage device. In particular, its share of the maximum power is taken into account in the control unit. The control unit then controls e.g. only the "remainder" of the input power, i.e. the maximum value is reduced by the power of the direct consumer in order to load the on-board power supply system ultimately with at most only the maximum value of power for the galley. In particular, the control unit responds depending on the actual power consumption of the direct consumer which is then determined e.g. by means of a power meter. In particular, the control unit is also configured in this case so that the total of the power consumptions of all consumers and of the energy storage device does not exceed the maximum value, in particular is ideally maintained precisely at the maximum value. The total is the total of the rated powers, the maximum powers or averaged powers. A direct consumer of this type is, in particular, a refrigerator or a lighting element of the galley. The power consumption of these devices can be ignored, e.g. compared with the power peaks of the galley, and/or is at least approximately constant throughout the mission duration.

In one preferred variant of this embodiment, at least one of the direct consumers is therefore not monitored by the control unit. A particularly simple overall system is thus obtained.

In one preferred variant of this embodiment, the total of the maximum power consumptions of the direct consumers is at most 40% of the maximum value. In particular, the total is at most 20%, 15%, 10%, 5%, 3%, 2% or 1%. In particular, the control unit is then designed to be set to a maximum value of e.g. 60%, 80%, 85%, 90%, 95%, 97%, 98% or 99% of the maximum power values with which the on-board power supply system is intended to be loaded.

In one preferred embodiment, at least one of the consumers is a storage device consumer which is supplied with energy exclusively via the energy storage device. The storage device consumer is therefore supplied exclusively with energy which is actually obtained from the energy storage device or with energy "looped through" by the energy storage device from the power input. The storage device consumer is, in particular, completely under the control of the control unit, i.e. its present power requirement is known to the control unit and the present power supply of the storage device consumer is completely controlled by the control unit. In particular, the storage device consumer has a maximum or normal input power which is above the maximum value. The storage device consumer is, in particular, of the type used for heating and/or preparing drinks and/or meals, in particular a beverage maker, convection oven or bread oven. Consumers, in particular high-power consumers, can be particularly well integrated into the device module as storage device consumers.

In one preferred embodiment, the energy storage device is divided into at least two secondary storage devices which are separated or independent from one another. In particular, at least one of the storage device consumers, if present, is assigned exclusively to each of the secondary storage devices, wherein, inter alia, the storage device consumer is therefore supplied only by this secondary storage device. In particular, the control unit is also divided into at least two secondary units. In particular, a dedicated secondary unit is assigned exclusively to each of the energy storage devices.

Each of the energy storage devices is autonomous or said energy storage devices are independent from one another. Thus, e.g. in the event of a failure of one energy storage device, the consumers continue to be operated on the other energy storage device, resulting in a redundancy or an emergency operation facility for a galley. In particular, the secondary storage devices can be arranged as spatially separated from one another. This results in a distributed storage device solution.

At least one or all of the secondary storage devices or the energy storage devices is accommodated, in particular, in a plug-in housing (insert).

In one preferred embodiment, the energy storage device is an accumulator and the accumulator has precisely one or at least one or, in particular, at least two, three, four, five or, in particular, a multiplicity of individual cells, wherein the individual cells can be arranged, in particular, as spatially separated from one another in the case of at least two, and, in the case of a multiplicity, in secondary groups also. The overall energy storage device can thus be integrated into the galley in a distributed and space-saving manner, for example utilizing a plurality of hitherto unused small cavities present in an existing galley design, without requiring additional installation space. In relation to thermally critical accumulators, the risk of a thermal runaway which cannot then spread from one secondary group or an individual cell of the accumulator to other secondary groups can also be reduced.

In one preferred embodiment, the control unit is configured to operate the energy storage device with a DoD (Depth of Discharge) value of less than 100%, in particular a maximum of 95%, 90%, 85%, 80%, 75% or 70%. This means that e.g. a maximum of 80% of the capacity of the energy storage device is used during its charging and discharging. In particular, DoD values of a maximum of 65%, 50%, 35% or 20% are selected. A low DoD value is beneficial in terms of the durability of an energy storage device, particularly in the case of accumulators.

In one preferred embodiment, the device module contains a feedback unit (FIG. 1, 40) to feed the energy stored in the energy storage device back into the on-board power supply system. The on-board power supply system can thus be supplied with energy from the device module e.g. in the event of a failure of other energy sources in the passenger aircraft. The energy storage device is then, in other words, a "backup emergency power storage device" for the passenger aircraft.

The present invention is also directed to a galley with the device module according to the invention. The device module is therefore located in the galley in the installed state, and the galley is built into the passenger aircraft. The galley and at least some of its embodiments and the respective advantages have already been explained accordingly in connection with the device module according to the invention.

In one preferred embodiment, the galley contains a device module in which the energy storage device is divided into at least two separate secondary storage devices which can be arranged as spatially separated from one another. The secondary storage devices (or secondary groups, see above) are arranged as spatially distributed in the galley. A respective adequate passive heat dissipation of each secondary storage device or secondary group is possible due to the spatial distribution. In particular, the secondary storage devices or secondary groups are arranged in relation to the specific design of the galley and the aircraft in such a way that an adequate heat dissipation is ensured when they are operated in accordance with their intended use. Alternatively or additionally, the secondary storage devices or secondary groups are also arranged in such a distributed manner that the additionally necessary installation space for the energy storage device is optimized or reduced in respect of the galley compared with a packed, one-piece, non-distributed arrangement of the energy storage device. A corresponding design is favourable particularly for an Li-ion (lithium-ion) accumulator. The accumulator or battery can thus be installed over a large area in the galley. Cooling problems are therefore eliminated. The "runaway" problem is furthermore alleviated, since no thermal coupling or a less close thermal coupling exists between adjacent cells (individual cells or secondary groups) of the accumulator in comparison with a non-distributed design.

The theoretical possibility of thermal runaway exists with lithium-ion accumulators or batteries. This alone does not pose a great risk, but rather the avalanche effect which occurs if a defective battery (cell) in tightly packed battery modules has a thermal knock-on effect on adjacent batteries. This risk can be significantly reduced with a distributed or large-area installation in the galley, since the battery cells or individual cells or secondary groups can be integrated individually into a protective housing.

In one preferred alternative of this embodiment, at least two of the individual cells or secondary groups are therefore arranged at a minimum distance from one another in the galley, wherein the minimum distance in relation to the installation situation of the galley in the passenger aircraft is selected as so great that a reciprocal thermal influencing of the individual cells or secondary groups is excluded in the event of a fault. "Excluded" is to be understood here in the sense of a normal safety measure or with acceptance of a specific residual risk.

The present invention is still further directed to a method for operating a device module or a galley according to the invention as described above. In the method, the input power is constantly limited to the maximum value. If applicable (i.e. if a power surplus exists), the power surplus is fed to the energy storage device. If applicable (i.e. if additional power exists or is required by the consumers), the present additional power is fed to the consumers from the energy storage device. The method is carried out in the installed state of the device module in the galley and the galley in the passenger aircraft.

The method and at least some of its embodiments and the respective advantages have already been explained accordingly in connection with the device module according to the invention or the galley according to the invention.

In one preferred embodiment, the device module is a device module in which the control unit is configured to maintain the input power constantly at the maximum value as long as the energy storage device has not yet attained a target state of charge, as explained above. In the method, the input power is maintained constantly at the maximum value as long as the energy storage device has not yet attained a target state of charge. Further related variants have already been explained accordingly above.

These embodiments and the respective advantages have already been explained in connection with the device module according to the invention or the galley according to the invention.

BRIEF DESCRIPTION OF THE DRAWINGS

Further features, effects and advantages of the invention can be found in the following description of a preferred example embodiment of the invention and in the attached figures. In the figures, in each case in a schematic diagram:

FIG. 2a shows a time diagram for a catering procedure on-board the aircraft,

FIG. 2b shows a time diagram of different sizes of the device module for the catering procedure from FIG. 2a.

DETAILED DESCRIPTION OF THE INVENTION

Figure 1:
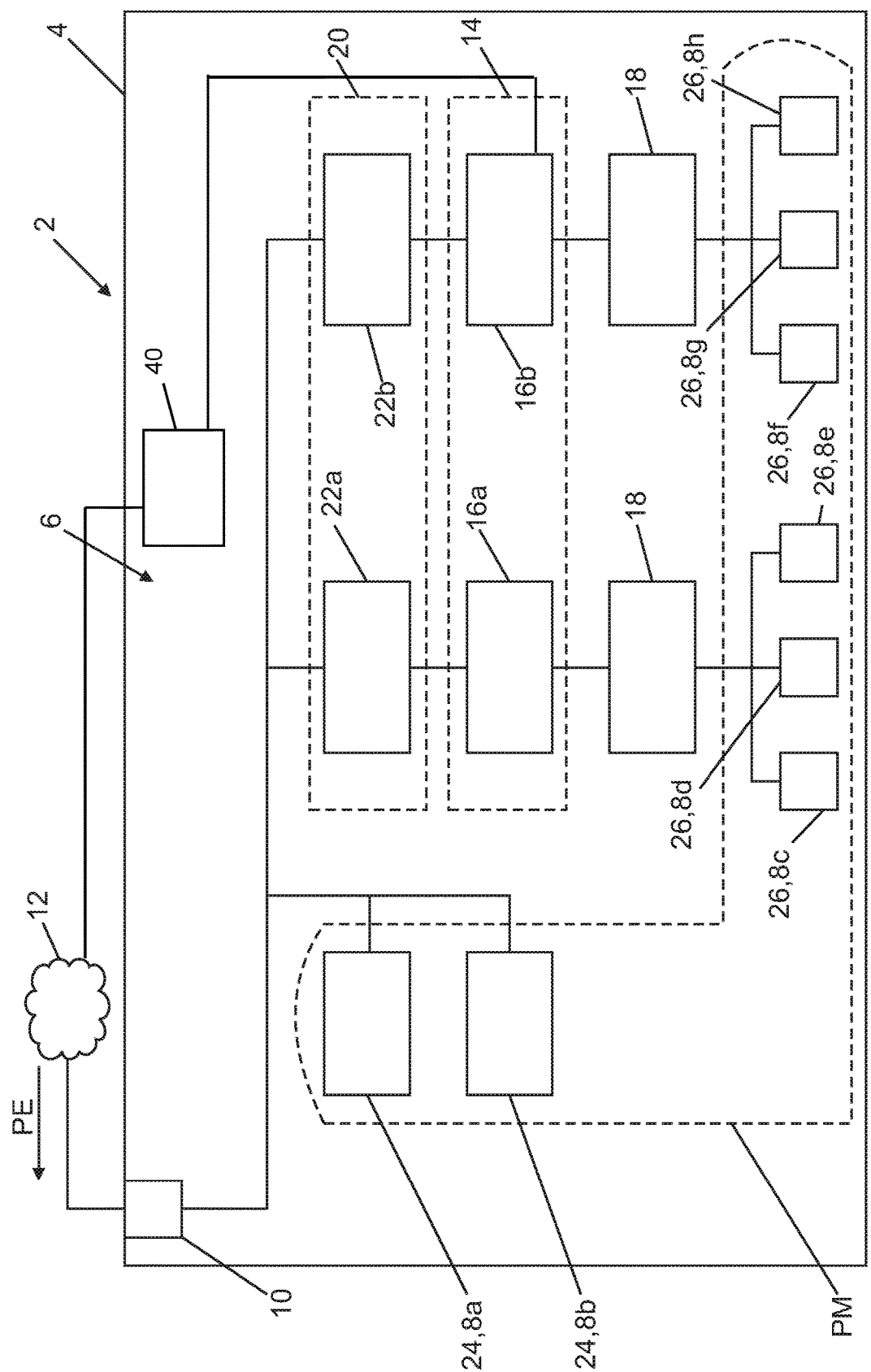
FIG. 1 shows a galley of an aircraft with a device module in a block diagram.

FIG. 1 shows a section from a passenger aircraft 2 (not further shown). The passenger aircraft 2 contains a merely intimated illustration of galley 4. The galley 4 contains a device module 6. Here, the device module 6 contains a total of eight consumers 8a-h; with their respective associated electrical power data and assigned normal operating times per meal/catering, these are as follows:

8a: a lighting arrangement to illuminate the entire galley 4 (continuous 100 W base load),
8b: a refrigerator (100 W peak load, continuously averaged 20 W),
8c,f: two beverage makers (in each case 750 W with 15 min preparation time),
8d,g: two convection ovens (in each case 3800 W with 30 min preparation time),
8e,h: two bread ovens (in each case 900 W with 25 min preparation time)

The consumers 8a-h and therefore the device module 6 therefore have a total maximum electrical power PM of 11.1 kW.

The device module 6 has a power input 10 which is connectable or is connected here to an on-board power supply system 12 (here merely symbolically indicated) of the passenger aircraft 2. The power input 10 is a three-phase 115 VAC connection here. The device module 6 is supplied with electrical energy or a present electrical input power PE via the power input 10

The device module 6 further contains an electrical energy storage device 14 which is divided here into two separate secondary storage devices 16a,b in the form of batteries or accumulators. Each of the secondary storage devices 16a,b has an electrical storage capacity of 4 kW. The consumers 8c-h are divided into two groups of identical consumers or identical device types (8c-e and 8f-h) and each group is connected via a respective DC/AC converter 18 to one of the secondary storage devices 16a,b or is supplied by the latter with electrical power or energy. The energy storage device 14 is used for the temporary storage of electrical energy from the power input 10 and for the output thereof to at least one of the consumers 8c-h.

The energy storage device 14 is an accumulator; the secondary storage devices 16a,b are a respective secondary group with a respective multiplicity of individual cells thereof. Said individual cells are arranged as spatially distributed in the galley 4. A reciprocal thermal influencing of the secondary storage devices 16a,b and therefore the individual cells is therefore excluded.

The device module 6 further contains a control unit 20 which is similarly divided here into two secondary units 22a,b. Each of the secondary units 22a,b manages one of the secondary storage devices 16a,b autonomously, i.e. independently from the respective other secondary storage device 16a,b. The control unit 20 is configured to limit the input power PE constantly to a maximum value WM, here of 0.7 kW, which is less than the maximum power PM of 11.1 kW. The maximum value WM is therefore 0.7 kW/11.1 kW=6.3% of the maximum power PM.

The control unit 20 is similarly configured or operates in such a way that it feeds a possible present power surplus 34 of the input power PE, i.e. a proportion of the latter which is not currently required by the consumers 8a-h, to the energy storage device 14, so that the power surplus 34 is stored there. Conversely, the control unit 20 is configured or operates in such a way that it feeds a possible additional power 36 of the consumers 8a-h which said consumers presently require but which cannot presently be covered from the input power PE, to these consumers 88a-h from the energy storage device 14.

The consumers 8a,b are direct consumers which are supplied with electrical energy directly from the power input 10, bypassing the energy storage device 14, and which are furthermore not monitored by the control unit 20. The total of the power consumptions of the direct consumers 24 of 0.2 kW is therefore 0.2 kW/0.7 kW=28.6% of the maximum value WM.

The consumers 8c-h are storage device consumers 26 which are supplied with energy exclusively via the energy storage device 14.

The power input 10 would conventionally be designed for a maximum input power PE amounting to the maximum power PM of 11.1 kW in order to be able to supply the consumers 8a-h at all times with sufficient electrical power. According to the invention, only a maximum WM=0.7 kW is intended to be drawn as the input power PE from the on-board power supply system 12. Since the two direct consumers 24 together have a power requirement of 0.2 kW, 0.5 kW remains for the supply of the storage device consumers 26. The control unit 20 therefore limits the residual power consumption, i.e. the power of 0.5 kW fed to the energy storage device 14. For reasons of symmetry, it limits the power consumption of each secondary storage device 16a,b in each case to 0.25 kW.

FIG. 2a explains an example of an operational sequence of a mission or flight of the passenger aircraft 2 in relation to the use of the galley 4. By way of example, 90 persons are intended to be supplied once with a hot meal and hot drinks and three times additionally with hot drinks only. The time t is plotted between the take-off (t=0 h) and landing (t=6 h) of the flight lasting 6 hours. At times t=0.5 h, t=3 h and t=5 h, drinks are prepared in the galley 4 with the consumers 8c,f. At time t=1.5 h, a meal with drinks is prepared with all consumers 8c-h. The start of the respective preparation is indicated symbolically by a respective arrow.

A hot meal, including a hot drink, requires energy amounting to 1.5 kW*15/60 h=0.375 kWh plus 7.6 kW*30/60 h=3.8 kWh plus 1.8 kW*25/60 h=0.75 kWh, in total therefore 4.925 kWh within the 30-minute preparation time. The preparation of hot drinks requires 1.5 kW*15/60 h=0.375 kWh. For simplification purposes, this is based on the rated power consumptions of the consumers 8c-h.

Alternatively, consumptions can also be determined on the basis of real measurements. This would result, for example, in totals of 0.175 kWh for the two beverage makers (8c,f), 1.425 kWh for the two convection ovens (8d,g), and 0.295 kWh for the two bread ovens (8e,h), since their rated power is not continuously drawn in each case during their operation. For a hot meal, including hot drinks, this would result in 1.96 kWh, including base load.

For the entire flight, using the example scenario, this would result in the following required energy input or the following quantities:

| Flight plan | Action | Power requirement | Connected load, internal | per phase |
|---|---|---|---|---|
| Start | | | | |
| + 0.5 h | first drinks round | 0.175 kWh | 1.5 kW | 13A |
| + 1 h | meal, drinks and bread | 1.9 kWh | 10.9 kW | 31A |
| + 1.5 h | second drinks round | 0.175 kWh | 1.5 kW | 13A |
| + 2 h | third drinks round | 0.175 kWh | 1.5 kW | 13A |
| + 1 h | | | | |
| Landing | total, incl. 0.72 kWh base load | 3.14 kWh | | |

According to a first variant. the energy storage device 14 is designed as follows:

The three-phase on-board power supply system with an on-board voltage of 115 VAC is loaded on the side of the galley 4 with the input power PE of 0.7 kW. The on-board power supply system thus makes 0.35 kWh available during a half-hour preparation phase for the hot meal with hot drinks. The difference of 1.61 kWh compared with the required total energy of 1.96 kWh must be provided from the energy storage device 14. The minimum storage capacity is therefore 1.61 kWh. The charge and discharge cycles of a battery or accumulator can be increased significantly if the battery is not fully discharged in each cycle. If a DoD (Depth of Discharge) value of 20% is therefore chosen, the battery requires a quantity of 1.6 kWh*5=8 kWh, wherein the factor 5 is derived from the only 20% permitted battery discharge. Here, the required charging time in the above scenario would be 4 hours. The secondary storage devices 16a,b in each case therefore have a storage capacity of 4 kWh.

In an alternative second variant, the on-board power supply system 12 could also be loaded with a maximum input power PW of 1 kW. During the half-hour preparation phase, the on-board power supply system thus makes an energy quantity of 0.5 kWh available. The battery then requires a quantity of 1.46 kWh*5=7.3 kWh. The charging time would then be 2.5 h.

A maximum connected load of 10.9 kW is then required internally within the galley (downstream of the DC/AC converter 18). This corresponds to a maximum current load of approximately 31 A per internal phase (with a 115 V three-phase AC current). The catering for the entire flight, including base load, requires 3.14 kWh. According to the first variant above, a total of 1.9 kWh would be required for a meal with hot drinks and fresh bread rolls, including base load. This value determines the battery capacity. The galley 4 requires a 3-phase 115 VAC connection on the aircraft side, which is then loaded only with a maximum of 0.7 kW (variant 1). This corresponds to a current load of 2A per phase. The entire electrical system, including the energy storage device 14, can be integrated within the galley 4.

With the use of Li-ion battery technology, an average weight of approximately 60 kg for the energy storage device 14 would be achieved for the concept, considering the energy density only.

Continuing from FIG. 2a, FIG. 2b (not drawn to scale in the ordinate direction) shows the present total power requirement 30 of all consumers 8a-h. The present input power PE is indicated by short dashes. The energy quantity 32 presently available in the energy storage device 14, i.e. its present state of charge, is furthermore indicated by long dashes.

At the start (t=0) of the flight, only the direct consumers 24 are initially operated in the galley 4 with their average power (mean value shown here) or base load of 120 W. The power requirement 30 is therefore 120 W. However, the control unit 20 adjusts the input power PE to its maximum value WM=700 W. A power surplus 34 of 580 W shown with left hatching is therefore fed to the energy storage device 14, as a result of which its energy quantity 32 increases.

The preparation of hot drinks begins at a flight time of t=0.5 h. The power requirement 30 increases to 0.12 kW (base load) plus 1.5 kW for the beverage makers (8c,f), i.e. to 1.62 kW. This power requirement 30 can no longer be covered from the input power PE of 700 W. The presently required additional power 36 of 0.92 kW indicated by right hatching is drawn from the energy storage device 14, as a result of which its energy quantity 32 decreases. The original situation then resumes until the food and drink preparation at time t=1.5 h.

All consumers 8a-h are now active for 15 minutes, then the beverage makers are switched off; the bread ovens are switched off after a further 10 minutes, and the convection ovens also after a further 5 minutes. Here also, the entire additional power 36 not supplied by the input power PE is obtained from the energy storage device 14.

This is then followed once more alternately by two time segments with base load and two time segments with hot drinks preparation, as described above. A time segment with base load recommences initially at t=5.25 h. The energy storage device has attained a target state of charge 38 of 50% at time t=5.5 h. A further charging of the energy storage device 14 is therefore unnecessary. Only the base load is still operated in the galley 4. The present input power PE is therefore reduced from the maximum value WM to the base load of 120 W. The energy storage device 14 therefore retains its presently stored energy quantity 32 unchanged as the target state of charge 38. The target state of charge 38 is therefore attained, since a sufficient charge is attained for the next scheduled flight. In the time period between t=0 and t=2 h, the target state of charge 38 is 80% and is therefore significantly higher, since the preparation of the meal is still pending. The target state of charge 38 has not been attained in this flight phase.

The energy storage device 14 is operated by the control unit 20 in the range of its state of charge from 25% to 75%, i.e. only 50% of its capacity is used, resulting in a DoD value of 50%.

During the operation of the galley 4, the input power PE is accordingly limited constantly to the maximum value WM, a power surplus 34 which is not required is fed constantly at the power input 10 to the energy storage device 14, and required additional power 36 is fed constantly to the consumers 8a-h from the energy storage device 14. The input power PE is furthermore maintained at the maximum value WM until the energy storage device 14 has attained its target state of charge 38.

REFERENCE NUMBER LIST

2 Passenger aircraft
4 Galley
6 Device module
8a-h Consumers
10 Power input
12 On-board power supply system
14 Energy storage device
16a,b Secondary storage device
18 DC/AC converter
20 Control unit
22a,b Secondary unit
24 Direct consumer
26 Storage device consumer
30 Power requirement (present)
32 Energy quantity (present)
34 Power surplus
36 Additional power
38 Target state of charge
PE Input power
PM Maximum power
WM Maximum value
t Time

What is claimed is:

1. A device module for a galley of a passenger aircraft, comprising
   at least one electrical consumer,
   wherein the device module internally has a total electrical maximum power of all the consumers (8a-h),
   a power input for supplying the device module, from an on-board power supply system of the passenger aircraft, with a present electrical input of power,
   an electrical energy storage device for the temporary storage of electrical energy from the power input and for the output thereof to at least one of the consumers,
   a control unit which is configured to limit the input power constantly to a maximum value which is less than the maximum power,
   to feed input power not presently required by the consumers as a power surplus to the energy storage device, and
   to feed additional power presently required for consumers and not covered from the power input to the consumers from the energy storage device,
   wherein the control unit is configured to maintain the input power constantly at the maximum value as long as the energy storage device has not yet attained a target state of charge.

2. The device module according to claim 1, wherein the maximum value of the input power is at most 70% of the maximum power of the consumers.

3. The device module according to claim 1, wherein the control unit is configured to maintain the input power constantly at the maximum value to control said input power according to a configurable profile.

4. The device module according to claim 1, wherein at least one of the consumers is a direct consumer which is supplied directly from the power input, bypassing the energy storage device.

5. The device module according to claim 4, wherein at least one of the direct consumers is not monitored by the control unit.

6. The device module according to claim 4, wherein the total of the power consumptions of the direct consumers is at most 40% of the maximum value.

7. The device module according to claim 1, wherein at least one of the consumers is a storage device consumer which is supplied with energy exclusively via the energy storage device.

8. The device module (6) according to claim 1, wherein the energy storage device is divided into at least two separate secondary storage devices.

9. The device module according to claim 1, wherein the energy storage device is an accumulator and the accumulator has at least one individual cell, or at least two individual cells.

10. The device module according to claim 1, wherein the device module contains a feedback unit to feed the energy stored in the energy storage device back into the on-board power supply system.

11. A galley comprising the device module according to claim 1.

12. The galley according to claim 11, wherein the energy storage device is divided into at least two separate secondary storage devices in which the secondary storage devices are arranged as spatially distributed in the galley.

13. The galley according to claim 12, wherein at least two of the individual cells are arranged at a minimum distance in relation to one another in the galley, wherein the minimum distance is selected in relation to the installation situation of the galley in the passenger aircraft as so great that a reciprocal thermal influencing of the individual cells is excluded in the event of a fault.

14. A method for operating a device module according to claim 1 in which:
    the input power is limited constantly to the maximum value,
    the present power surplus is fed to the energy storage device,
    the present additional power is fed to the consumers from the energy storage device, and
    wherein the control unit is configured to maintain the input power constantly at the maximum value as long as the energy storage device has not yet attained a target state of charge.

15. The method according to claim 14, wherein the control unit of the device module is configured to maintain the input power constantly at the maximum value to control said input power according to a configurable profile.

16. A method for operating a galley according to claim 11, in which
- the input power is limited constantly to the maximum value,
- the present power surplus is fed to the energy storage device,
- the present additional power is fed to the consumers from the energy storage device, and
- wherein the control unit is configured to maintain the input power constantly at the maximum value as long as the energy storage device has not yet attained a target state of charge.

17. The method according to claim 16, wherein the control unit of the device module is configured to maintain the input power constantly at the maximum value to control said input power according to a configurable profile.

* * * * *